(No Model.) 2 Sheets—Sheet 1.
H. F. SMITH.
Vehicle Wheel.
No. 234,817. Patented Nov. 23, 1880.
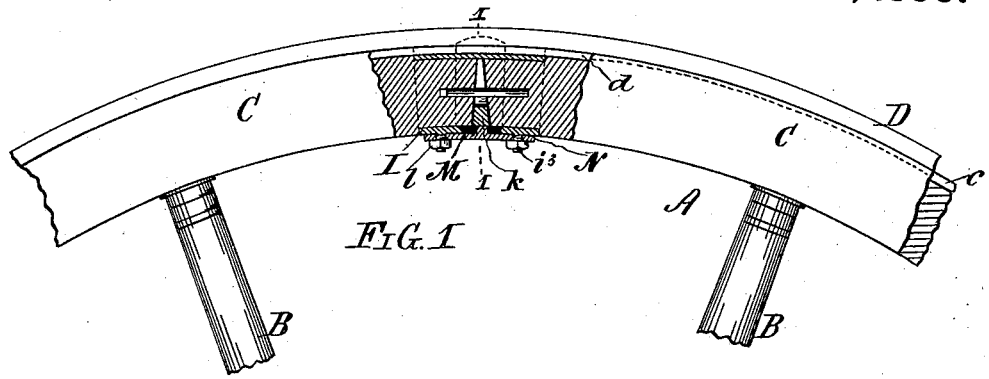
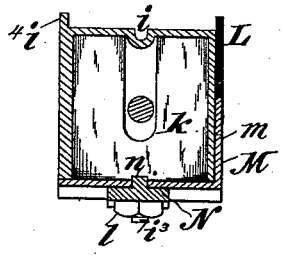
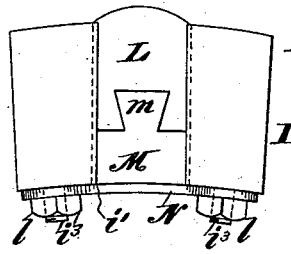
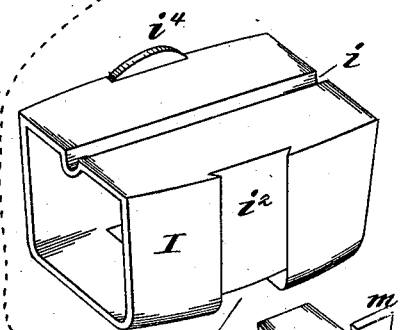
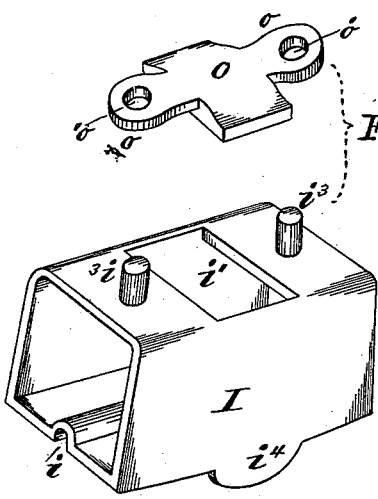
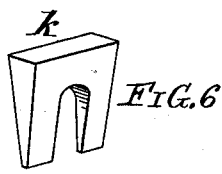
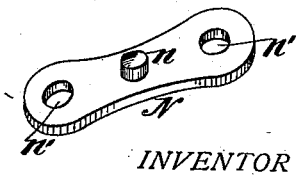
WITNESSES:
S. J. Van Stavoren
A. Connolly
INVENTOR
Henry F. Smith,
By Connolly Bros.,
ATTORNEYS.
N. PETERS, PHOTO-LITHOGRAPHER, WASHINGTON, D. C.

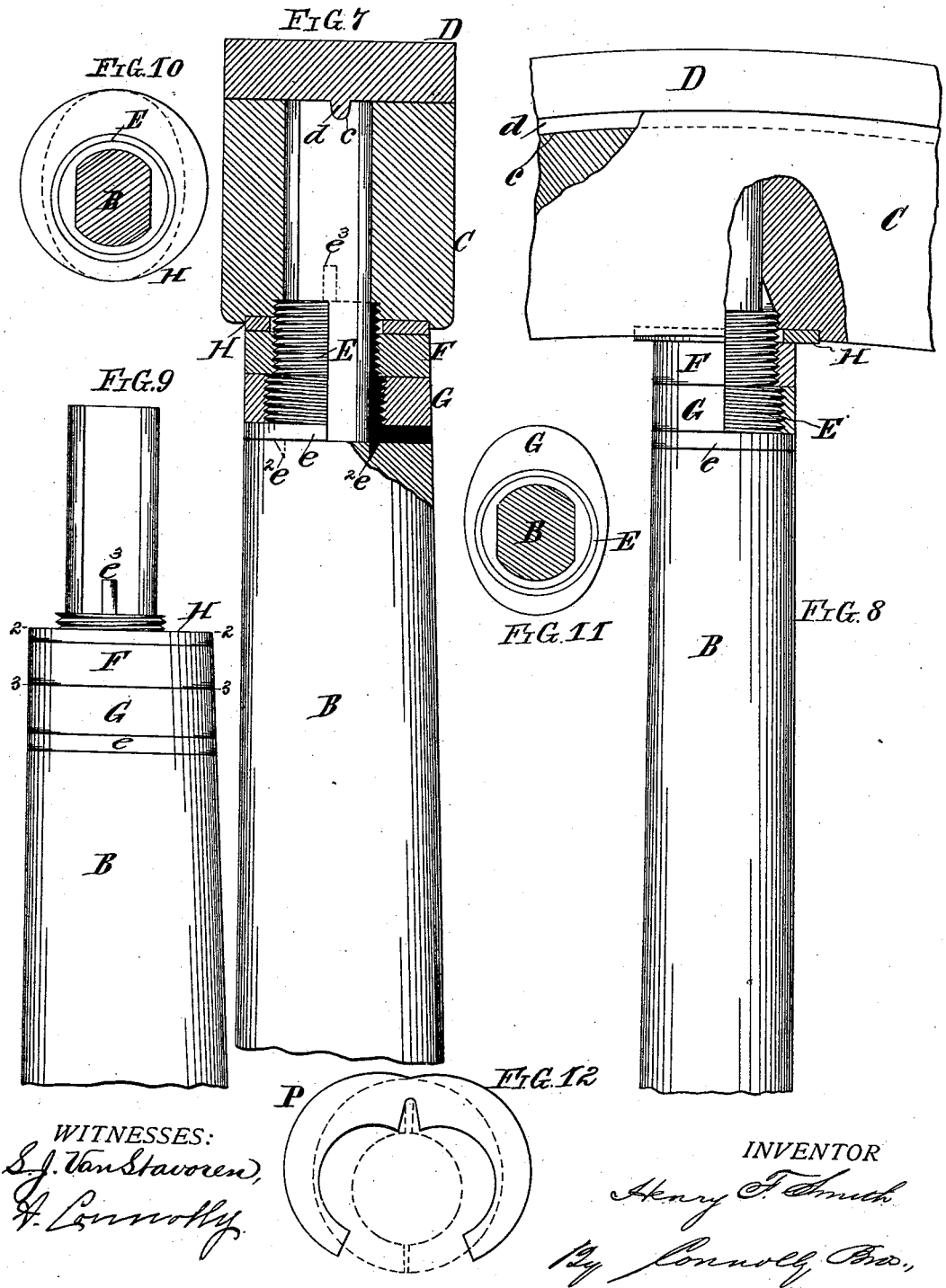

UNITED STATES PATENT OFFICE.

HENRY F. SMITH, OF PHILADELPHIA, PENNSYLVANIA.

VEHICLE-WHEEL.

SPECIFICATION forming part of Letters Patent No. 234,817, dated November 23, 1880.

Application filed April 26, 1880. (No model.)

*To all whom it may concern:*

Be it known that I, HENRY F. SMITH, a citizen of the United States, residing at Philadelphia, in the county of Philadelphia and State of Pennsylvania, have invented certain new and useful Improvements in Adjustable Wheels, of which the following is a specification, reference being had to the annexed drawings, wherein—

Figure 1 is an elevation of a part of the rim of a wheel and its spokes, illustrating my improvements as applied thereto, said rim being partly in section to show a longitudinal section of the felly-box and the application of the tightening-wedge. Fig. 2 is an enlarged section on the line 1 1, Fig. 1. Fig. 3 is an elevation of the felly-box. Fig. 4 is a perspective of the felly-box and its accompanying fastening parts. Fig. 5 is a perspective of a modification of the same. Fig. 6 is a perspective of the tightening-wedge. Fig. 7 is a transverse vertical section of felly, tire, and spoke-tightening mechanism, the spoke being partly in elevation. Fig. 8 is a front elevation of the same, partly in section. Fig. 9 is a broken elevation of the spoke and its tightening mechanism. Figs. 10 and 11 are sections respectively on the lines 2 2 and 3 3 of Fig. 9; and Fig. 12 is a plan of the spring-washer for filling in and taking up the space caused by shrinkage, &c., when the spokes of the wheel become loose.

My invention has for its object to provide an adjustable wheel so constructed that it may be tightened or loosened as required.

It has for its further object to provide means for fastening the tire on the fellies without bolts or screws or nails.

My improvements consist in the peculiar construction and combination of parts hereinafter referred to, described, and specifically claimed.

Referring to the annexed drawings, B B represent the spokes of a section, A, of a wheel; C C, the felly-sections, and D the tire. The spokes are of the customary construction, fitted to the fellies in the usual or any suitable manner. The felly-sections have a peripheral groove, $c$, in which fits an annular rib or tongue, $d$, on the inside of the tire.

The spokes are, as usual, oval or oblong in cross-section, and their tenons are out of center, so as to leave shoulders on the outer side of the spoke larger than on the inner side.

E represents a metallic band conforming to and encircling the spoke and forming part of the tenon, said band having a collar or flange, $e$, which supports the spoke-shoulder, and spurs $e^2$ $e^2$, which enter the latter to hold it securely in place. The lower or outer end of the band E fits in a countersunk recess in the felly, spurs $e^3$ at right angles to the spurs $e^2$ entering the felly, as shown. The interior opening or passage through the band E is oval or oblong, with straight sides and rounded ends, as shown in Figs. 10 and 11, so as to conform to the outline of the spoke and to prevent turning on the latter. The exterior of the band E is cylindrical, and between the collar $e$ and the felly is of two diameters, having right and left threads of different sizes. On these threads are placed corresponding threaded nuts F and G, the latter being a jam-nut. These nuts, while bored cylindrically, have oval peripheries, so as to conform to the outline of the spoke, thereby preserving the symmetry, strength, and elasticity of the same, while avoiding any projections which would catch mud, &c., to produce friction and increase the draft, and which are likely to strike obstacles, such as stones, &c., in the road. Between the nut F and the felly C, and resting in a countersunk recess in the latter, is a washer, H.

Encircling the felly-joints is a box, I, having a groove, $i$, corresponding to the groove in the fellies and for the same purpose. One side of the box has an opening, $i'$, to permit the insertion of a wedge (shown at $k$) between the ends of the fellies or in their joint when the latter opens. To close this opening a plate, L, is fitted in a dovetail groove, $i^2$, in the side of the box, matching with an L-plate, M, having a dovetail end, $m$, and opening $m'$, said last-mentioned plate covering the opening $i'$. Over the plate M is then placed another plate, N, having a stud, $n$, which enters the opening $m'$ and openings $n'$ $n'$, which receive the studs $i^3$ $i^3$ on the felly-box. The plate L projects beyond the outer surface of the box I, forming a protector, for the tire and preventing the latter from slipping off, a lip, $i^4$, on the opposite side protecting the tire and preventing slipping off on that side; or the felly-box I may be formed as shown in Fig. 5, into the opening $i'$ of which fits the plate O, having wings $o\ o$ with openings $o'\ o'$. When said plate is fitted to the box I the studs $i^3\ i^3$ on the latter pass through the openings $o'\ o'$, and the parts are then held together by nuts $l\ l$, applied to said studs, as shown in Figs. 1 and 3.

The operation is as follows: When from shrinkage or other cause the felly ends separate or their joints open, the spokes are in effect lengthened by screwing down the nuts F on the washers H, securing them against unscrewing by the jam-nuts G. One or more wedges are then inserted in the boxes I and held therein by the plate or plates already described. This operation will be necessitated usually by reason of abrasion, wear and tear, or shrinkage of the fellies and expansion of the tire in dry seasons. In wet seasons, on the contrary, when the wood expands and the tire contracts, the wedges may be removed and the spokes shortened by turning the nuts in the contrary direction to that already described.

The flush finish produced by having the periphery of flange or collar $e$ and nuts F G conformable to oval outline of spoke may be always maintained by inserting an open or spring washer, P, as shown in Fig. 12, between the nut F and washer H when any tightening is required, said spring or open washer being of a thickness equal to the space required to be filled.

By the foregoing construction the tire is fitted to the wheel and fastened without the possibility of coming off without screws, nails, or rivets or openings for the same. Means are also provided whereby a wedge can be introduced between the felly-joints and securely held there. The symmetry, strength, and elasticity of the spoke continue unimpaired, and the original form and length of the latter and method of fitting the same in the fellies are unchanged. At the same time means are provided for lengthening and shortening said spokes as necessity may require for tightening and loosening the wheels.

What I claim as my invention is—

1. A metallic band for spokes having an oval or oblong opening, an oval flange or collar, $e$, and right and left threads, in combination with mortised felly and spoke having full-length tenon extending into the felly-mortise to insure strength and elasticity, substantially as shown and described.

2. In combination with a spoke and felly, a metallic band, E, having an oval or oblong opening, an oval collar or flange, $e$, spurs $e^2\ e^3$, extending into or penetrating respectively the felly and spoke-shoulder, and right and left screws with oval nuts F G and washer H, substantially as shown and described.

3. In combination with the oval spokes and nuts F G, the oval spring or open washers P, for preserving the flush finish of the spokes, substantially as shown and described.

4. The felly box or collar I, having opening $i'$, dovetailed slides L and M, and plate N, substantially as shown and described.

5. In combination with felly box or collar I, having opening $i'$ and means, substantially as described, for closing the same, a wedge, $k$, for filling the opening between the fellies and giving a solid bearing to the latter, substantially as shown and described.

6. In combination with a felly-box, I, a flange or lip, $i^4$, on one side, and a slide, L, with projection or flange on the other side, to admit the tire and prevent it from slipping off the fellies sidewise, substantially as shown and described.

In testimony that I claim the foregoing I have hereunto set my hand this 24th day of April, 1880.

HENRY F. SMITH.

Witnesses:
AL P. BURCHELL,
S. J. VAN STAVOREN.